(12) United States Patent
Manabe et al.

(10) Patent No.: US 9,493,703 B2
(45) Date of Patent: Nov. 15, 2016

(54) LIQUID CRYSTAL MEDIUM AND HIGH-FREQUENCY COMPONENTS COMPRISING SAME

(75) Inventors: Atsutaka Manabe, Bensheim (DE); Christian Jasper, Seligenstadt (DE); Volker Reiffenrath, Rossdorf (DE); Constanze Brocke, Gross-Gerau (DE); Detlef Pauluth, Ober-Ramstadt (DE); Dagmar Klass, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 14/347,784

(22) PCT Filed: Sep. 7, 2012

(86) PCT No.: PCT/EP2012/003772
§ 371 (c)(1),
(2), (4) Date: Mar. 27, 2014

(87) PCT Pub. No.: WO2013/045029
PCT Pub. Date: Apr. 4, 2013

(65) Prior Publication Data
US 2014/0239227 A1    Aug. 28, 2014

(30) Foreign Application Priority Data
Sep. 27, 2011 (EP) .................... 11007826

(51) Int. Cl.
*C09K 19/18* (2006.01)
*C09K 19/44* (2006.01)
*C09K 19/12* (2006.01)
*C09K 19/30* (2006.01)

(52) U.S. Cl.
CPC ............. *C09K 19/18* (2013.01); *C09K 19/44* (2013.01); *C09K 2019/123* (2013.01); *C09K 2019/183* (2013.01); *C09K 2019/188* (2013.01); *C09K 2019/3025* (2013.01); *C09K 2219/11* (2013.01)

(58) Field of Classification Search
None
See application file for complete search history.

(56) References Cited

U.S. PATENT DOCUMENTS

| 7,361,288 B2 | 4/2008 | Lussem et al. |
| 2005/0067605 A1 | 3/2005 | Lussem et al. |
| 2012/0119141 A1 | 5/2012 | Manabe et al. |
| 2012/0182200 A1 | 7/2012 | Manabe et al. |

FOREIGN PATENT DOCUMENTS

| DE | 102004029429 A1 | 2/2005 |
| DE | 102010045370 A1 | 4/2011 |
| JP | 2005 120208 A | 5/2005 |
| WO | 2011009524 A1 | 1/2011 |

OTHER PUBLICATIONS

International Search Report for PCT/EP2012/003772 dated Dec. 12, 2012.
English Abstract of JP-2005 120208, Publication Date: May 12, 2005.
Yang, F. et al., "Microwave liquid crystal wavelength selector," Applied Physics Letters, Nov. 26, 2011, vol. 79, No. 22, pp. 3717-3719.
Lapanik, A. et al., "Room temperature nematic LCs mixtures with high birefringence for Microwave Applications," 38th Topical Meeting on Liquid Crystals, Mar. 10-12, 2010.
Lapanik, A. et al., "Nematic LCs mixture with high birefringence in the microwave region," Frequenze, Jan. 2011, vol. 65, No. 1-2, pp. 15-19, released Apr. 11, 2011.
Lapanik, A et al., "Liquid crystal systems for microwave applications," Dissertation by Artsiom Lapanik, Darmstadt, Germany, 2009.

*Primary Examiner* — Cynthia H Kelly
*Assistant Examiner* — Anna Malloy
(74) *Attorney, Agent, or Firm* — Millen, White, Zelano and Branigan, P.C.

(57) ABSTRACT

The present invention relates to liquid crystal media and to high-frequency components comprising same, especially microwave components for high-frequency devices, such as devices for shifting the phase of microwaves, in particular for microwave phased-array antennas.

10 Claims, No Drawings

LIQUID CRYSTAL MEDIUM AND HIGH-FREQUENCY COMPONENTS COMPRISING SAME

The present invention relates to liquid crystal media and to high-frequency components comprising same, especially microwave components for high-frequency devices, such as devices for shifting the phase of microwaves, in particular for microwave phased-array antennas.

Liquid crystal media have been used for some time in electro-optical displays (liquid crystal displays—LCDs) in order to display information.

Recently, however, liquid crystal media have also been proposed for use in components for microwave technology, such as, for example, in WO 2011/009524 A8, DE 10 2004 029 429 A and in JP 2005-120208 (A).

As a typical microwave application, the concept of the inverted microstrip line as described by K. C. Gupta, R. Garg, I. Bahl and P. Bhartia: Microstrip Lines and Slotlines, $2^{nd}$ ed., Artech House, Boston, 1996, is employed, for example, in D. Dolfi, M. Labeyrie, P. Joffre and J. P. Huignard: Liquid Crystal Microwave Phase Shifter. *Electronics Letters*, Vol. 29, No. 10, pp. 926-928, May 1993, N. Martin, N. Tentillier, P. Laurent, B. Splingart, F. Huert, P H. Gelin, C. Legrand: Electrically Microwave Tuneable Components Using Liquid Crystals. $32^{nd}$ European Microwave Conference, pp. 393-396, Milan 2002, or in Weil, C.: Passiv steuerbare Mikrowellenphasenschieber auf der Basis nichtlinearer Dielektrika [Passively Controllable Microwave Phase Shifters based on Nonlinear Dielectrics], Darmstädter Dissertationen D17, 2002, C. Weil, G. Lüssem, and R. Jakoby: Tuneable Invert-Microstrip Phase Shifter Device Using Nematic Liquid Crystals, *IEEE MTT-S Int. Microw. Symp.*, Seattle, Wash., June 2002, pp. 367-370, together with the commercial liquid crystal K15 from Merck KGaA. C. Weil, G. Lüssem, and R. Jakoby: Tuneable Invert-Microstrip Phase Shifter Device Using Nematic Liquid Crystals, *IEEE MTT-S Int. Microw. Symp.*, Seattle, Wash., June 2002, pp. 367-370, achieve phase shifter qualities of 12°/dB at 10 GHz with a control voltage of about 40 V therewith. The insertion losses of the LC, i.e. the losses caused only by the polarisation losses in the liquid crystal, are given as approximately 1 to 2 dB at 10 GHz in Weil, C.: Passiv steuerbare Mikrowellenphasenschieber auf der Basis nichtlinearer Dielektrika [Passively Controllable Microwave Phase Shifters based on Nonlinear Dielectrics], Darmstädter Dissertationen D17, 2002. In addition, it has been determined that the phase shifter losses are determined primarily by the dielectric LC losses and the losses at the waveguide junctions. T. Kuki, H. Fujikake, H. Kamoda and T. Nomoto: Microwave Variable Delay Line Using a Membrane Impregnated with Liquid Crystal. *IEEE MTT-S Int. Microwave Symp. Dig.* 2002, pp. 363-366, June 2002, and T. Kuki, H. Fujikake, T. Nomoto: Microwave Variable Delay Line Using Dual-Frequency Switching-Mode Liquid Crystal. *IEEE Trans. Microwave Theory Tech.*, Vol. 50, No. 11, pp. 2604-2609, November 2002, also address the use of polymerised LC films and dual-frequency switching-mode liquid crystals in combination with planar phase shifter arrangements.

A. Penirschke, S. Müller, P. Scheele, C. Weil, M. Wittek, C. Hock and R. Jakoby: "Cavity Perturbation Method for Characterization of Liquid Crystals up to 35 GHz", $34^{th}$ European Microwave Conference—Amsterdam, pp. 545-548 describe, inter alia, the properties of the known single liquid crystal substance K15 (Merck KGaA, Germany) at a frequency of 9 GHz.

A. Gaebler, F. Goelden, S. Müller, A. Penirschke and R. Jakoby "Direct Simulation of Material Permittivites using an Eigen-Susceptibility Formulation of the Vector Variational Approach", 12MTC 2009—International Instrumentation and Measurement Technology Conference, Singapore, 2009 (IEEE), pp. 463-467, describe the corresponding properties of the known liquid crystal mixture E7 (likewise Merck KGaA, Germany).

DE 10 2004 029 429 A describes the use of liquid crystal media in microwave technology, inter alia in phase shifters. DE 10 2004 029 429 A has already investigated liquid crystal media with respect to their properties in the corresponding frequency range.

Liquid crystal media comprising for example compounds of the formula below,

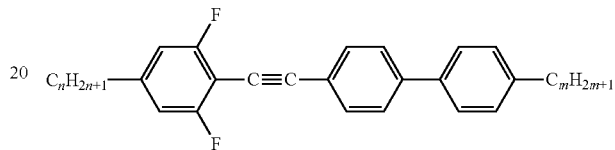

are used as a host mixture for the investigation of compounds, which are suggested for the usage in components for microwave applications and are described in F. Gölden, "Liquid Crystal Based Microwave Components with Fast Response Times: Materials, Technology, Power Handling Capability", Dissertation, Technische Universität Darmstadt, 2009, (D17), A. Lapanik, "Single compounds and mixtures for microwave applications, Dielectric, microwave studies on selected systems", Dissertation, Technische Universität Darmstadt, 2009, (D17), "Nematic LC mixtures with high birefringence in microwave region", A. Lapanik, F. Gölden, S. Müller, A. Penirschke, R. Jakoby und W. Haase, *Frequenz* 2011, 65, 15-19, "Highly birefringent nematic mixtures at room temperature for microwave applications", A. Lapanik, F. Gölden, S. Müller, R. Jakoby und W. Haase, *Journal of Optical Engineering*, published online, as well as in the laid-open documents DE 10 2010 045 370.6 und DE 10 2010 051 508.0. Moreover, DE 10 2010 051 508.0 discloses the usage of oligo-phenylene compounds in combination with bistolane compounds in microwave applications.

However, these compositions are afflicted with serious disadvantages. Most of them result, besides other deficiencies, in disadvantageously high losses and/or inadequate phase shifts or inadequate material quality.

For these applications, liquid crystal media having particular, hitherto rather unusual, uncommon properties, or combinations of properties, are required.

Novel liquid crystal media having improved properties are thus necessary. In particular, the loss in the microwave region must be reduced and the material quality (η) must be improved.

In this context, the dielectric anisotropy in the microwave region is defined as $$\Delta \epsilon_r = (\epsilon_{r,\|} - \epsilon_{r,\perp}).$$

The tuneability (τ) is defined as $$\tau = (\Delta \epsilon_r / \epsilon_{r,\|}).$$

The material quality (η) is defined as $$\eta = (\tau / \tan \delta_{\epsilon_r, max}), \text{ where}$$

the maximum dielectric loss is $$\tan \delta_{\in r, max.} \equiv \max.\{\tan \delta_{\in r,\perp}; \tan \delta_{\in r,\parallel}\}.$$

In addition, there is a demand for an improvement in the low-temperature behaviour of the components. Both an improvement in the operating properties and in the shelf life is necessary here.

There is therefore a considerable demand for liquid crystal media having suitable properties for corresponding practical applications.

Surprisingly, it has now been found that it is possible to achieve liquid crystal media having a suitably high $\Delta \in$, a suitable, broad nematic phase range $\geq 140°$ C. and high $\Delta n \geq 0.340$ that do not have the disadvantages of the prior-art materials, or at least only do so to a considerably reduced extent.

These improved liquid crystal media in accordance with the present invention comprise three or more compounds of formula I

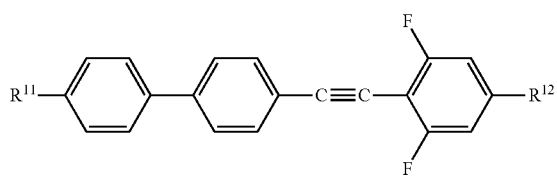

wherein
$R^{11}$ denotes $C_nH_{2n+1}$ or $CH_2$=$CH$—$(CH_2)_z$, preferably $C_nH_{2n+1}$,
$R^{12}$ denotes $C_mH_{2m+1}$ or $O$—$C_mH_{2m+1}$ or $(CH_2)_z$—$CH$=$CH_2$, preferably $C_mH_{2m+1}$,
n and m independently of one another, denote an integer in the range from 1 to 9 and
z denotes 0, 1, 2, 3 or 4,
in a total concentration of $\geq 90\%$ and wherein the medium comprises
the compound of formula Ia

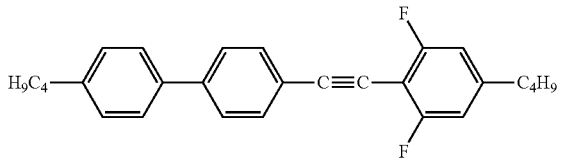

in a total concentration of $\geq 45\%$,
the compound of formula Ib

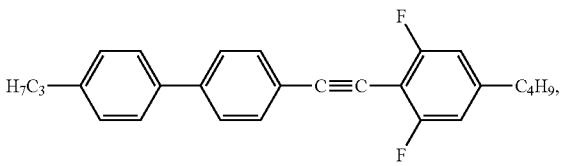

and
the compound of formula Ic

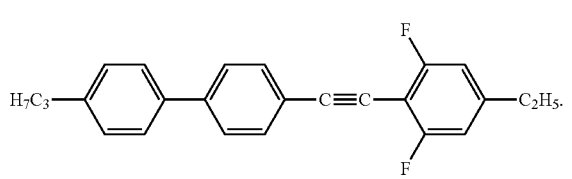

The invention further relates to a component for high-frequency technology comprising a liquid crystal medium as described above and below. In this context, both high-frequency technology and hyper-frequency technology denote applications having frequencies in the range from 1 MHz to 1 THz, preferably from 1 GHz to 500 GHz, more preferably 2 GHz to 300 GHz, particularly preferably from about 5 to 150 GHz comprising a component for high-frequency technology comprising a liquid crystal medium as described above and below, suitable for operation in the microwave range.

The invention further relates to the use of liquid crystal media as described above and below in a component for high-frequency technology.

The invention further relates to a microwave device, comprising a component as described above and below.

Said devices and components include, without limitation, phase shifters, varactors, wireless and radio wave antenna arrays, matching circuit adaptive filters and others.

In particular, the liquid crystal media of this invention show the following advantageous properties.

They exhibit:
a high birefringence $\Delta n$, usually an $\Delta n$ 0.340 or more
and/or
broad nematic phase ranges usually up to 140° C. or more
and/or
a high dielectric anisotropy $\Delta \in$, usually 1.0 or more
and/or
phase shifter qualities of 15°/dB or more and/or
high values for the material quality ($\eta$) of 5 or more.

The liquid crystal media of this invention are formulated to meet the above criteria. The media are also especially suitable for mass production and can be processed using industry standard equipment.

In a preferred embodiment according to the instant application, the liquid crystal media can comprise one or more homologue compounds of formula I are selected from the group of formulae Id to In

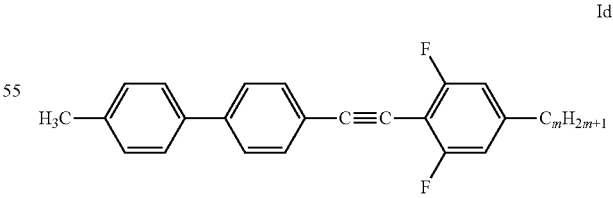

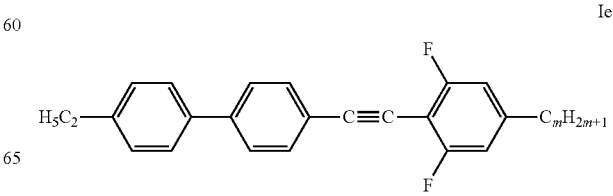

-continued

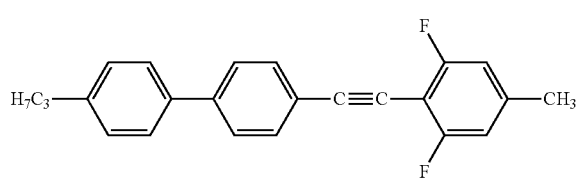
If

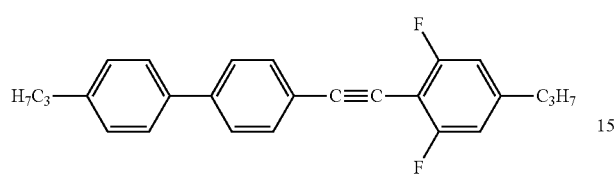
Ig

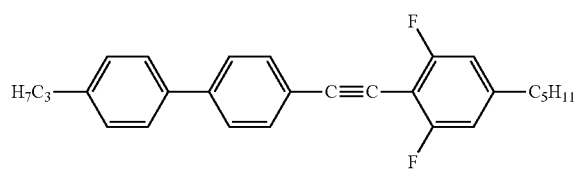
Ih

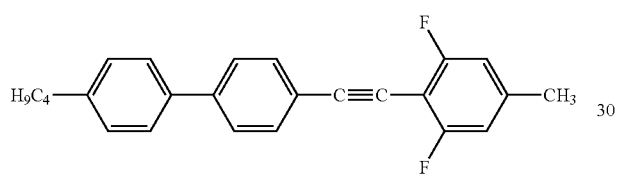
Ii

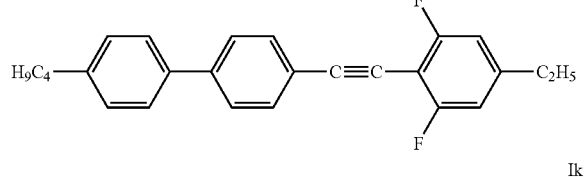
Ij

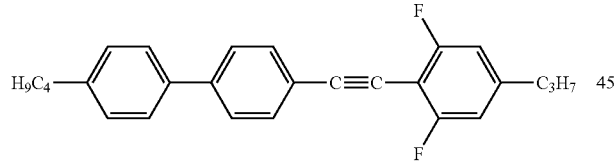
Ik

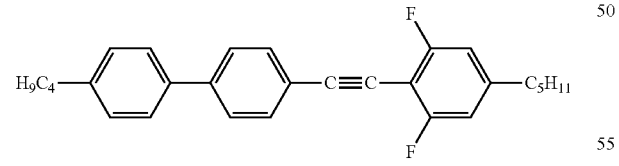
Im

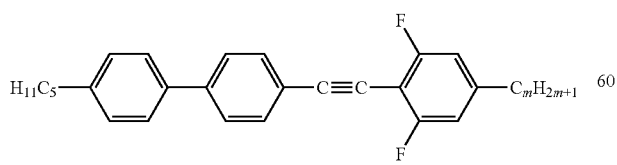
In wherein
m has the meanings as given in formula I.

In another preferred embodiment, the terminal straight alkyl chain groups of compounds of formula I are substituted by preferably halogen, -alkoxy, -alkenyl, -alkinyl, —NCS and $SF_6$, which are not explicitly mentioned above and can optionally and advantageously also be used in the media in accordance with the present invention.

Very preferred are liquid crystal media, comprising additionally one or more compounds of formula II. Compounds of formula II are characterized by an acceptable optical anisotropy, high positive dielectrical anisotropy, therefore good steerability and broad nematic phases.

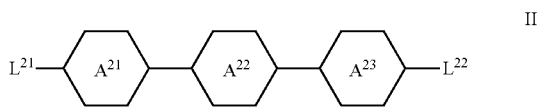
II wherein
$L^{21}$ denotes $R^{21}$ or $X^{21}$,
$L^{22}$ denotes $R^{22}$ or $X^{22}$,
$R^{21}$ and $R^{22}$, independently of one another, denote H, unfluorinated alkyl or unfluorinated alkoxy having 1 to 17, preferably having 3 to 10, C atoms or unfluorinated alkenyl, unfluorinated alkenyloxy or unfluorinated alkoxyalkyl having 2 to 15, preferably 3 to 10, C atoms, preferably alkyl or unfluorinated alkenyl,
$X^{21}$ and $X^{22}$, independently of one another, denote H, F, Cl, —CN, —NCS, —$SF_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and

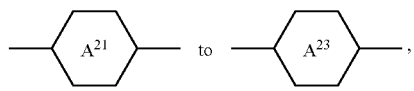

independently of one another, denote

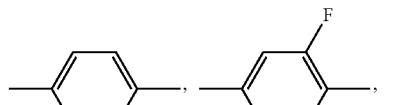

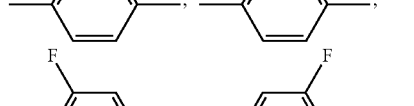

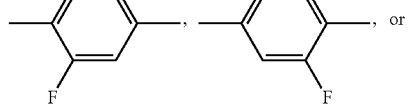

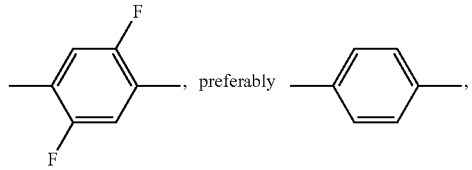

-continued

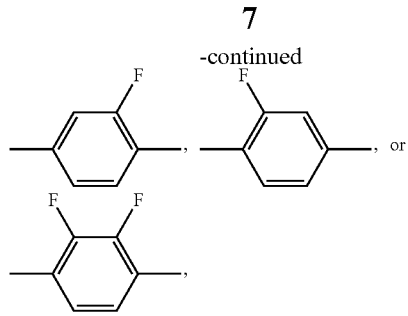

In a preferred embodiment the compounds of the formula II, preferably selected from formulae II-1:

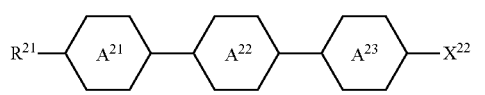

II-1 in which the parameters have the respective meanings indicated above for formula II and preferably $R^{21}$ denotes unfluorinated alkyl having 1 to 7 C atoms or unfluorinated alkenyl having 2 to 7 C atoms, $R^{22}$ denotes unfluorinated alkyl having 1 to 7 C atoms or unfluorinated alkenyl having 2 to 7 C atoms or unfluorinated alkoxy having 1 to 7 C atoms, $X^{21}$ and $X^{22}$, independently of one another, denote F, Cl, —OCF$_3$, —CF$_3$, —CN, —NCS or —SF$_5$, preferably F, Cl, —OCF$_3$ or —CN.

The compounds of the formula II-1 are preferably selected from the group of the compounds of the formulae II-1a and very preferably completely consist thereof:

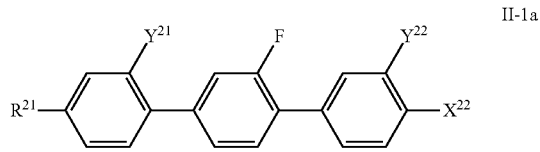

II-1a wherein the parameters have the respective meanings indicated above for formula II-1 and in which $Y^{21}$ and $Y^{22}$ each, independently of one another, denote H or F, and preferably $R^{21}$ denotes alkyl or alkenyl, and $X^{21}$ denotes F, Cl or —OCF$_3$.

The compounds of the formula II-1a are preferably selected from the group of the compounds of the formulae II-1a-1 and II-1a-4, preferably selected from the group of the compounds of the formulae II-1a-1 and II-1a-2, more preferably these compounds of the formula II-1a predominantly consist, even more preferably essentially consist and very particularly preferably completely consist thereof:

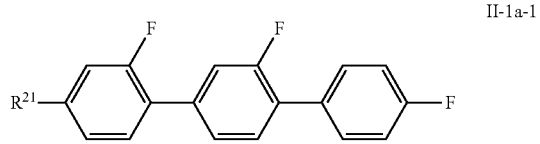

II-1a-1

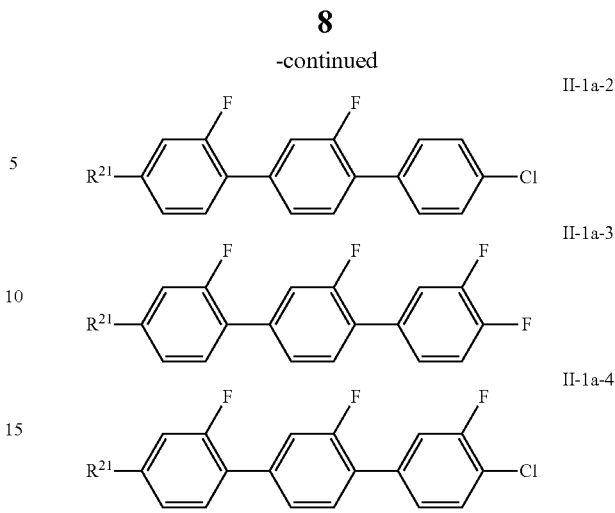

wherein $R^{21}$ has the meaning indicated above and preferably denotes $C_oH_{2o+1}$, in which o denotes an integer in the range from 1 to 15, preferably in the range from 1 to 7 and particularly preferably 1 to 5.

The liquid crystal media in accordance with the present invention can comprise additionally one or more compounds of the formula III. Compounds of formula III are characterized by an acceptable optical anisotropy, high positive dielectrical anisotropy, therefore good steerability and broad nematic phases.

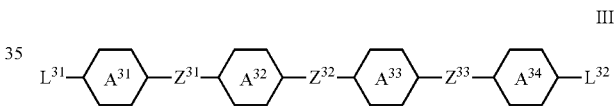

III wherein $L^{31}$ denotes $R^{31}$ or $X^{31}$, $L^{32}$ denotes $R^{32}$ or $X^{32}$, $R^{31}$ and $R^{32}$, independently of one another, denote H, unfluorinated alkyl or alkoxy having 1 to 15, preferably 3 to 10, C atoms or unfluorinated alkenyl, alkenyloxy or alkoxyalkyl having 2 to 15, preferably 3 to 10, C atoms, preferably unfluorinated alkyl or alkenyl, $X^{31}$ and $X^{32}$, independently of one another, denote H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms, preferably fluorinated alkoxy, fluorinated alkenyloxy, F or Cl, and $Z^{31}$ to $Z^{33}$, independently of one another, denote trans-CH=CH—, trans-CF=CF—, —C≡C— or a single bond, preferably one or more of them denotes a single bond, and particularly preferably all denote a single bond,

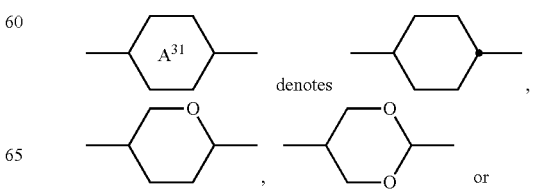

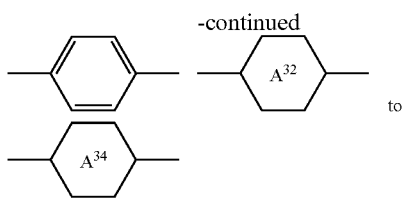

independently of one another, denote

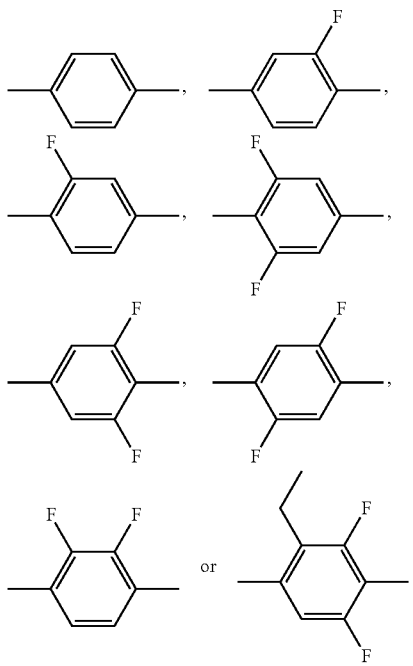

or

The compounds of the formula III are preferably selected from the group of the compounds of formulae III-1, preferably these compounds of the formula III predominantly consist, more preferably essentially consist and even more preferably completely consist thereof:

III-1

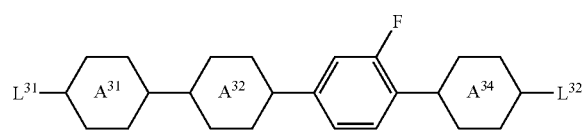

wherein the parameters have the respective meanings indicated above under formula III and preferably
one of

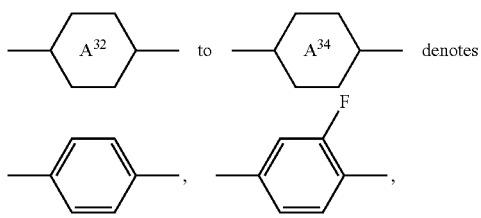

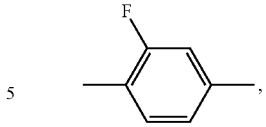

and
wherein
$L^{31}$ denotes $R^{31}$ or $X^{31}$,
$L^{32}$ denotes $R^{32}$ or $X^{32}$,
$R^{31}$ has the meaning indicated above and preferably denotes $C_nH_{2n+1}$
$R^{32}$ has the meaning indicated above and preferably denotes $C_mH_{2m+1}$ or $O-C_mH_{2m+1}$
$X^{31}$ and $X^{32}$ has the meaning indicated above and preferably denotes fluorinated alkoxy, fluorinated alkenyloxy, F or Cl, and
n and m independently of one another, denotes an integer in the range from 1 to 15, preferably in the range from 1 to 7 and particularly preferably 1 to 5.

The preferred combinations of ($R^{31}$ and $R^{32}$) here are, in particular, ($C_nH_{2n+1}$ and $C_mH_{2m+1}$) and ($C_nH_{2n+1}$ and $O-C_mH_{2m+1}$).

The compounds of the formula III-1 are preferably selected from the group of the compounds of the formulae III-1a, more preferably these compounds of the formula III-1 predominantly consist, even more preferably essentially consist and very particularly preferably completely consist thereof:

III-1a

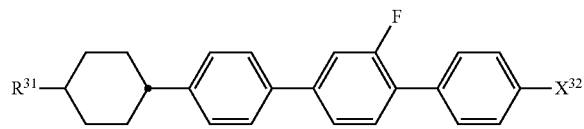

wherein the parameters have the meaning given above and preferably
$R^{31}$ has the meaning indicated above and preferably denotes $C_nH_{2n+1}$, and
n denotes an integer in the range from 1 to 15, preferably in the range from 1 to 7 and particularly preferably 1 to 5, and
$X^{32}$ has the meaning indicated above preferably denotes F, $OCF_3$ or Cl.

In another preferred embodiment, the liquid crystal media according to present invention can additionally comprise one or more compounds of the formula IV. Compounds of formula IV are characterized by high optical anisotropy, excellent microwave characteristics and broad nematic phases.

IV

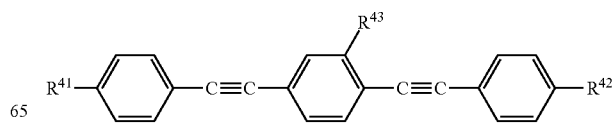

wherein
R$^{41}$ to R$^{43}$, independently of one another, denote unfluorinated alkyl or unfluorinated alkoxy, each having 1 to 15 C atoms, unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkylcycloalkenylalkyl, each having up to 15 C atoms, preferably R$^{41}$ and R$^{42}$, independently of one another, denote unfluorinated alkyl or unfluorinated alkoxy, each having 1 to 7 C atoms, or unfluorinated alkenyl, unfluorinated alkenyloxy or unfluorinated alkoxyalkyl, each having 2 to 7 C atoms, particularly preferably R$^{41}$ denotes unfluorinated alkyl having 1 to 7 C atoms or unfluorinated alkenyl, unfluorinated alkenyloxy or unfluorinated alkoxyalkyl, each having 2 to 7 C atoms, and particularly preferably R$^{42}$ denotes unfluorinated alkyl or unfluorinated alkoxy, each having 1 to 7 C atoms, and preferably R$^{43}$ denotes unfluorinated alkyl having 1 to 5 C atoms, unfluorinated cycloalkyl or cycloalkenyl having 3 to 7 C atoms, unfluorinated alkylcyclohexyl or unfluorinated cyclohexylalkyl, each having 4 to 12 C atoms, or unfluorinated alkylcyclohexylalkyl having 5 to 15 C atoms, particularly preferably cyclopropyl, cyclobutyl or cyclohexyl and very particularly preferably n-alkyl, particularly preferably methyl, ethyl or n-propyl.

The compounds of the formula IV are particularly preferably selected from the group of the compounds of the formulae IV-1 to IV-3, preferably of the formulae IV-1 and/or IV-2 and/or IV-3, preferably of the formulae IV-1 and IV-2, these compounds more preferably predominantly consist thereof, even more preferably essentially consist thereof and very particularly preferably completely consist thereof:

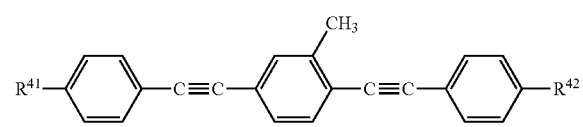

IV-1

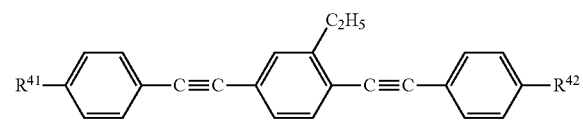

IV-2

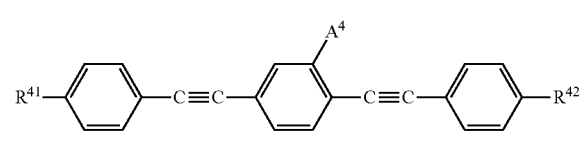

IV-3 wherein
A$^4$ denotes cycloalkyl having 3 to 6 C atoms, preferably cyclopropyl, cyclobutyl or cyclohexyl, particularly preferably cyclopropyl or cyclohexyl and very particularly preferably cyclopropyl,
and the other parameters have the respective meanings indicated above for formula I and preferably
R$^{41}$ denotes unfluorinated alkyl having 1 to 7 C atoms, and
R$^{42}$ denotes unfluorinated alkyl having 1 to 7 C atoms or unfluorinated alkoxy having 1 to 7 C atoms.

In another preferred embodiment, the liquid crystal media can additionally comprise one or more compounds having 5 to 15 five-, six- or seven-membered rings, preferably 1,4-linked phenylene rings, which may optionally be substituted, preferably of the formula V. Compounds of formula IV are characterized by high optical anisotropy and excellent microwave characteristics.

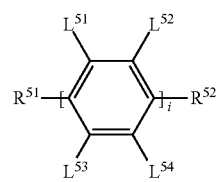

V wherein
R$^{51}$ and R$^{52}$, independently of one another, denote halogen, preferably F or Cl, unfluorinated alkyl or fluorinated alkyl or unfluorinated alkoxy or fluorinated alkoxy, each having 1 to 15 C atoms, or unfluorinated alkenyl or fluorinated alkenyl, unfluorinated alkenyloxy or unfluorinated alkoxyalkyl or fluorinated alkoxyalkyl, each having 2 to 15 C atoms, in which, in addition, one or more "—CH$_2$—" groups may be replaced, independently of one another, by cycloalkyl having 3 to 6 C atoms, preferably having 4 or 6 C atoms, and alternatively, in addition, one of R$^{11}$ and R$^{12}$ or both R$^{11}$ and R$^{12}$ denote H, preferably
R$^{51}$ and R$^{52}$, independently of one another, denote unfluorinated alkyl or unfluorinated alkoxy, each having 1 to 7 C atoms, or unfluorinated alkenyl, unfluorinated alkenyloxy or unfluorinated alkoxyalkyl, each having 2 to 7 C atoms, particularly preferably
R$^{51}$ denotes unfluorinated alkyl having 1 to 7 C atoms or unfluorinated alkenyl, unfluorinated alkenyloxy or unfluorinated alkoxyalkyl, each having 2 to 7 C atoms, and particularly preferably
R$^{52}$ denotes unfluorinated alkyl or unfluorinated alkoxy, each having 1 to 7 C atoms, and L$^{51}$ to L$^{54}$ on each appearance, in each case independently of one another, denote H, alkyl having 1 to 15 C atoms, F or Cl, and i denotes an integer in the range from 5 to 15, preferably from 5 or 8 to 12 and particularly preferably from 5 or 9 to 10, and preferably
at least two of the substituents present
L$^{51}$ to L$^{54}$ have a meaning other than H, and they preferably denote alkyl, and R$^{51}$ denotes C$_n$H$_{2n+1}$ or CH$_2$=CH—(CH$_2$)$_Z$, and
R$^{52}$ denotes C$_m$H$_{2m+1}$ or O—C$_m$H$_{2m+1}$ or (CH$_2$)$_Z$—CH=CH$_2$, and wherein
n and m, independently of one another, denote an integer in the range from 1 to 15, preferably in the range from 1 to 7 and particularly preferably 1 to 5, and
z denotes 0, 1, 2, 3 or 4, preferably 0 or 2.

The present invention likewise relates to the compounds of the formula V in which R$^{51}$ and R$^{52}$ both have a meaning other than H.

Preference is given to compounds of the formula V wherein
in the case where i is equal to 6 to 8,
$L^{51}$ to $L^{54}$ on each appearance, in each case independently of one another, denote H, alkyl having 1 to 8 C atoms, particularly preferably having 2 to 5 C atoms, F or Cl, and preferably at least two of the substituents $L^{51}$ to $L^{54}$ present denote alkyl,
in the case where i is equal to 9 to 12,
$L^{51}$ to $L^{54}$ on each appearance, in each case independently of one another, denote H, alkyl having 3 to 10 C atoms, particularly preferably having 4 to 8 C atoms, F or Cl, and preferably at least three, particularly preferably at least four, of the substituents $L^{51}$ to $L^{54}$ present denote alkyl,
in the case where i is equal to 13 to 15,
$L^{51}$ to $L^{54}$ on each appearance, in each case independently of one another, denote H, alkyl having 5 to 15 C atoms, particularly preferably having 6 to 12 C atoms, F or Cl, and
i denotes an integer in the range from 5 to 15, preferably from 5 or 8 to 12 and particularly preferably from 5 or 9 to 10, and
preferably at least four, particularly preferably at least six, of the substituents $L^{51}$ to $L^{54}$ present denote alkyl.

The compounds of the formula V are preferably selected from the group of the compounds of the formulae VA and VB. The compounds of formula V preferably predominantly consist thereof, more preferably essentially consist thereof and even more preferably completely consist thereof:

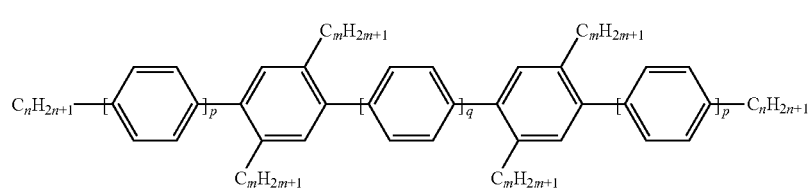

VA

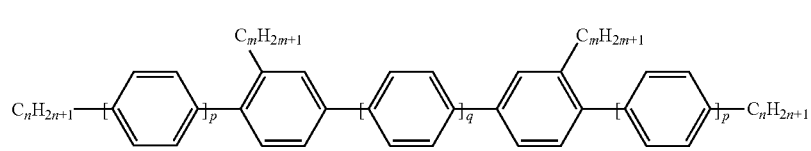

VB wherein
n and m, independently of one another, denote an integer from 1 to 15, preferably 3 to 12,
p denotes an integer from 1 to 4, preferably 2,
q denotes an integer from 1 to 6, preferably 1 or 4, and
(p+q) denotes an integer from 4 to 12, preferably 4, 6 or 8.

Especially preferred are compounds of the formula VA selected from the group of the compounds of the formulae VA-1 to VA-3:

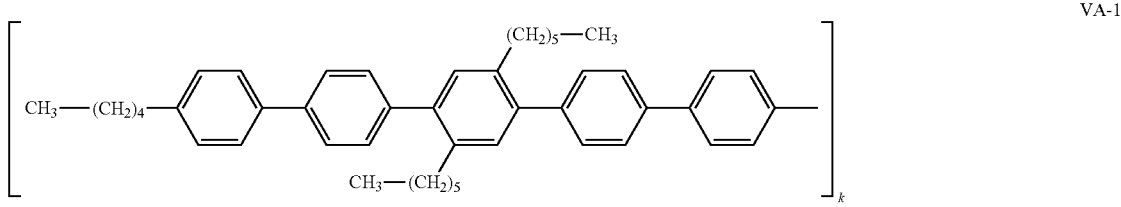

VA-1

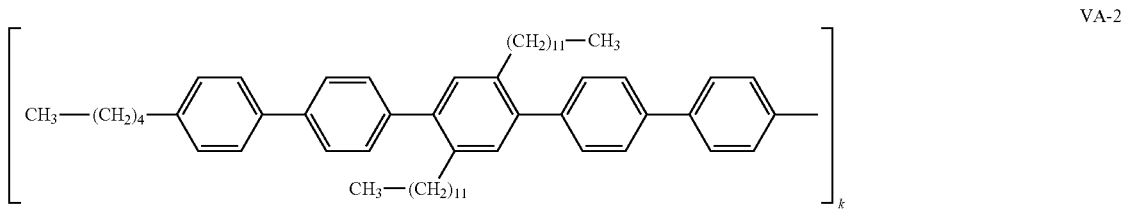

VA-2

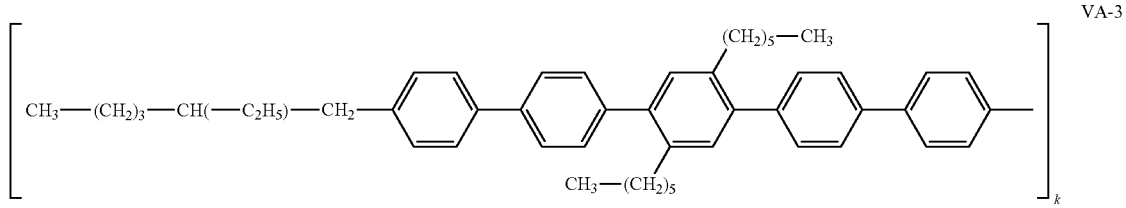

wherein
k denotes 2.

Preferred compounds of the formula VB are selected from the group of the compounds of the formulae VB-1 and VB-2:

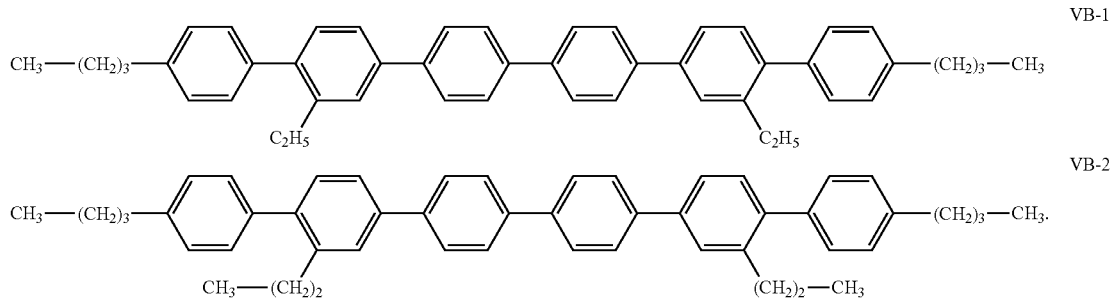

Other mesogenic compounds, which are not explicitly mentioned above, can optionally and advantageously also be used in the media in accordance with the present invention. Such compounds are known to the person skilled in the art.

The compounds of formulae I to V can be synthesized according to or in analogy to methods which are known per se and which are described in standard works of organic chemistry such as, for example, Houben-Weyl, Methoden der organischen Chemie, Thieme-Verlag, Stuttgart.

The liquid crystal media according to the invention consist of a plurality of compounds, preferably 3 to 15, more preferably 3 to 10 and very preferably 3 to 5 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called pre-mixes, which can be, for example, homologous or eutectic mixtures of compounds, or using so-called "multibottle" systems, the constituents of which are themselves ready-to-use mixtures.

In a preferred embodiment of the present invention, the liquid crystal media comprise three or more compounds of the formula I and one or more compounds of the formula II.

In a more preferred embodiment of the present invention, the liquid crystal media comprise three or more compounds of the formula I and one or more compounds of the formula III.

In an even more preferred embodiment, the liquid crystal media comprise three or more compounds of the formula I and one or more compounds of the formula IV.

In an especially preferred embodiment, the liquid crystal media comprise three or more compounds of the formula I and one or more compounds of the formula V.

In particular, preference is given to the liquid crystal media, which comprise three or more compounds of the formula I and/or one or more compounds of the formula II, and/or one or more compounds of the formula III, and/or one or more compounds of the formula IV and/or one or more compounds of the formula V.

The liquid crystal media in accordance with the present application preferably comprise in total ≥90%, preferably ≥95% and more preferably the liquid crystal media consists exclusively of compounds of the formulae Ia, Ib and Ic.

In a preferred embodiment, the liquid crystal media comprises four, five or more compounds of formula I.

The liquid crystal media in accordance with the present application preferably comprise in total 45 to 73%, preferably 48 to 65% and particularly preferably 50 to 55% of compounds of the formula Ia.

The liquid crystal media in accordance with the present application preferably comprise in total 1 to 30%, preferably 10 to 27% and particularly preferably 15 to 26% of compounds of the formula Ib.

The liquid crystal media in accordance with the present application preferably comprise in total 26 to 50%, preferably 26 to 40% and particularly preferably 26 to 30% of compounds of the formula Ic.

In a preferred embodiment of the present invention, in which the liquid crystal media comprise in each case one or more compounds of the formulae I and II to V, the concentration of the compounds of the formula I is preferably 90 to 95%, the concentration of the compounds of the formula II to V is preferably 0 to 10%, more preferably 2 to 10% and particularly preferably 5 to 10%.

Further preferred are liquid crystal media comprising,
90 to 100%, preferably 95 to 100% of compounds of subformulae Ia, Ib and Ic, in the concentrations of:
45 to 73%, preferably 48 to 65% and particularly preferably 50 to 55% of the total mixture of the compound of formula Ia, and/or
1 to 30%, preferably 10 to 27% and particularly preferably 15 to 26% of the total mixture of the compound of formula Ib,
and/or
26 to 50%, preferably 26 to 40% and particularly preferably 26 to 30% of the total mixture of the compound of formula Ic,
and/or
1 to 18%, preferably 3 to 15%, more preferably 5 to 10% of the total mixture of one or more homologue compounds of formula I, preferably selected from formula Id to In,
and/or
0 to 10%, preferably 2 to 10%, very preferably 5 to 10% of the total mixture of one or more compounds of formula II to V,
but in a total amount ≤100%.

Especially preferred concentrations of compounds of formula II to V are:
0 to 10%, preferably 2 to 10%, more preferably 5 to 10% of the total mixture of one or more compounds of formula II, especially of formula II-1a, in particular of formulae II-1a-1 to II-1a-4,
and/or
0 to 10%, preferably 2 to 10%, more preferably 5 to 10% of the total mixture of one or more compounds of formula II, especially of formula IIIa,
and/or
0 to 10%, preferably 2 to 10%, more preferably 5 to 10% of the total mixture of one or more compounds of formula IV, especially of formulae IV-1 to IV-a,
and/or
0 to 10%, preferably 1 to 10%, more preferably 5 to 10% of the total mixture of one or more compounds of formula V, especially of formula VA and VB, in particular of formulae VA-1 to VA-3 and VB-1 to VB-2.
but in a total amount of the total mixture ≤100%.

Especially preferably, the liquid crystal media according to the present invention, consist exclusively of the above-mentioned compounds.

In this application, "comprise" in connection with compositions means that the entity in question, i.e. the medium comprises the compound or compounds indicated, preferably in a total concentration of 3% or more and very preferably 5% or more. Additionally, "consists exclusively" means that the entity in question comprises preferably 99% or more and very preferably 100.0% of the compound or compounds indicated.

The liquid-crystalline media according to the present invention may contain further additives, like dyes, antioxidants, chiral dopants, UV stabilizers, in usual concentrations. The total concentration of these further constituents is in the range of 50 ppm to 10%, preferably 100 ppm to 6%, based on the total mixture. The concentrations of the individual compounds used each are preferably in the range of 0.1% to 3%.

The liquid crystal media in accordance with the present invention preferably have a clearing point of 140° C. or more, more preferably 150° C. or more, still more preferably 160° C. or more, particularly preferably 170° C. or more and very particularly preferably 180° C. or more.

The liquid crystal media according to the invention preferably have nematic phases of in each case at least from −20° C. to 140° C., preferably from −30° C. to 150° C. and very particularly preferably from −40° C. to 160° C. The phase particularly preferably extends to 170° C. or more, preferably to 180° C. or more. The expression have a nematic phase here means on the one hand that no smectic phase and no crystallisation are observed at low temperatures at the corresponding temperature and on the other hand that no clearing occurs on heating from the nematic phase. Components having a nematic phase at the measurement temperature of 20° C. are measured as such, all others are treated like compounds. The investigation at low temperatures is carried out in a flow viscometer at the corresponding temperature and checked by storage in test cells having a layer thickness of 5 μm for at least 100 hours. At high temperatures, the clearing point is measured in capillaries by conventional methods.

The $\Delta\epsilon$ of the liquid crystal media in accordance with the invention, at 1 kHz and 20° C., are preferably 1 or more, more preferably 2 or more and very preferably 3 or more.

In the present application, the expression dielectrically positive describes compounds or components where $\Delta\epsilon>3.0$, dielectrically neutral describes those where $-1.5\leq\Delta\epsilon\leq3.0$ and dielectrically negative describes those where $\Delta\epsilon<-1.5$. $\Delta\epsilon$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 μm. The voltage applied is a rectangular wave having a frequency of 1 kHz and an effective value of typically 0.5 V to 1.0 V, but it is always selected to be below the capacitive threshold of the respective test mixture.

$\Delta\epsilon$ is defined as $(\epsilon_\parallel-\epsilon_\perp)$, while $\epsilon_{ave.}$ is $(\epsilon_\parallel+2\epsilon_\perp)/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

The $\Delta n$ of the liquid crystal media in accordance with the present invention, at 589 nm ($Na^D$) and 20° C., is preferably in the range from 0.340 or more to 0.90 or less, more preferably in the range from 0.350 or more to 0.90 or less, even more preferably in the range from 0.400 or more to 0.85 or less and very particularly preferably in the range from 0.450 or more to 0.800 or less.

The liquid crystal media are investigated with respect to their properties in the microwave frequency range as described in A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548.

Compare in this respect also A. Gaebler, F. Gölden, S. Müller, A. Penirschke and R. Jakoby "Direct Simulation of Material Permittivites . . . ", 12MTC 2009—International Instrumentation and Measurement Technology Conference, Singapore, 2009 (IEEE), pp. 463-467, and DE 10 2004 029 429 A, in which a measurement method is likewise described in detail.

The liquid crystal is introduced into a polytetrafluoroethylene (PTFE) or fused silica capillary. The capillary has an internal radius of 180 μm and an external radius of 350 μm. The effective length is 2.0 cm. The filled capillary is introduced into the centre of the cavity with a resonance frequency of 30 GHz. This cavity has a length of 6.6 mm, a width of 7.1 mm and a height of 3.6 mm. The input signal (source) is then applied, and the result of the output signal is recorded using a commercial vector network analyser. For other frequencies (e.g. 19 GHz), the dimensions of the cavity can be adjusted accordingly.

The change in the resonance frequency and the Q factor between the measurement with the capillary filled with the liquid crystal and the measurement without the capillary filled with the liquid crystal is used to determine the dielectric constant and the loss angle at the corresponding target frequency by means of equations 10 and 11 in A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548, as described therein.

The values for the components of the properties perpendicular and parallel to the director of the liquid crystal are obtained by alignment of the liquid crystal in a magnetic field. To this end, the magnetic field of a permanent magnet is used. The strength of the magnetic field is 0.35 tesla. The alignment of the magnets is set correspondingly and then rotated correspondingly through 90°.

The material quality $\eta = \tau / \tan \delta_\perp$ of the preferred liquid crystal materials is 5 or more, preferably 6 or more, preferably 8 or more, preferably 10 or more, preferably 15 or more, preferably 17 or more, particularly preferably 20 or more and very particularly preferably 25 or more.

The liquid crystalline media according to the present invention are very well suited for the preparation of microwave components, such as tunable phase shifters. These may be tuned by the application of magnetic and/or electric fields. Tuning by electric fields is generally preferred. These phase shifters are operable in the UHF-band (0.3-1 GHz), L-band (1-2 GHz), S-band (2-4 GHz), C-band (4-8 GHz), X-band (8-12 GHz), Ku-band (12-18 GHz), K-band (18-27 GHz), Ka-band (27-40 GHz), V-band (50-75 GHz), W-band (75-110 GHz) and up to 1 THz.

Preferable frequencies for operation are C-band, X-band, Ku-band, K-band, Ka-band, V-band, W-band, and up to 1 THz. Particularly preferable frequencies for operation are Ku-band, K-band, Ka-band, V-band, W-band, and up to 1 THz.

The preferred liquid crystal materials have phase shifter qualities of 15°/dB or more, preferably 20°/dB or more, preferably 30°/dB or more, preferably 40°/dB or more, preferably 50°/dB or more, particularly preferably 80°/dB or more and very particularly preferably 100°/dB or more.

The construction of the phase shifters according to the present application is known to the expert. Typically loaded line phase shifters, "inverted microstrip lines" (short IMSL), Finline phase shifters, preferably Antipodal Finline phase shifters, slotline phase shifters, microstrip line phase shifters or coplanar waveguides (CPW) phase shifters are used. These components allow the realization of reconfigurable antenna arrays, which are fully electrically reconfigurable and which allow to steer the main beam direction of the antennas, to blank out interferers and/or to achieve high directivity. Another preferred embodiment is waveguide partially filled with the liquid crystals according to the present invention, as described in WO 2011/036243 A1, which is encompassed herein by reference herewith.

In a preferred embodiment the inventive phase shifters are combined into array antennas, preferably into phased array antennas, reflectarray antennas, and arrays consisting of Vivaldi antennas.

Especially preferred applications for the tunable antenna arrays according to the present application are satellite communication systems, for operation e.g. between satellites, from satellites to ground stations, from mobile ground stations via satellite to stationary ground stations or to other mobile ground stations, e.g. for receiving and sending communication, television or video to vehicles like ships, planes, trains and cars. Other preferred applications are short-distance antennas of the wireless routers to the laptop PCs, tablet computers and mobile devices.

In the present application, the term "compounds" is taken to mean both one compound and a plurality of compounds, unless expressly stated otherwise.

For an overview of terms and definitions in connection with liquid crystals and mesogens see Pure Appl. Chem. 73(5), 888 (2001) and C. Tschierske, G. Pelzl and S. Diele, Angew. Chem. 2004, 116, 6340-6368.

The term "mesogenic group" means a group with the ability to induce liquid crystal (LC) phase behaviour. The compounds comprising mesogenic groups do not necessarily have to exhibit an LC phase themselves. It is also possible that they show LC phase behaviour only in mixtures with other compounds (e.g. liquid crystal host mixture), or when the mesogenic compounds or the mixtures thereof are polymerised. For the sake of simplicity, the term "liquid crystal" is used hereinafter for both mesogenic and LC materials.

The liquid crystals employed are either individual substances or mixtures. They preferably have a nematic phase.

The parameter ranges indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy (Δn) is determined at a wavelength of 589.3 nm. The dielectric anisotropy (Δ∈) is determined at a frequency of 1 kHz or if explicitly stated at a frequency 19 GHz. The threshold voltages, as well as all other electro-optical properties, are determined using test cells produced at Merck KGaA, Germany. The test cells for the determination of Δ∈ have a cell thickness of approximately 20 μm. The electrode is a circular ITO electrode having an area of 1.13 cm² and a guard ring. The orientation layers are SE-1211 from Nissan Chemicals, Japan, for homeotropic orientation ($\in_\parallel$) and polyimide AL-1054 from Japan Synthetic Rubber, Japan, for homogeneous orientation ($\in_\perp$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here.

The term "alkyl" preferably encompasses straight chain and branched alkyl groups having 1 to 15 carbon atoms, in particular the straight chain groups methyl, ethyl, propyl, butyl, pentyl, hexyl and heptyl. Groups having 2 to 10 carbon atoms are generally preferred.

The term "alkenyl" preferably encompasses straight chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxyalkyl" preferably encompasses straight-chain radicals of the formula $C_nH_{2n+1}$—O—$(CH_2)_m$, in which n and m each, independently of one another, denote 1 to 10. Preferably, n is 1 and m is 1 to 6.

Compounds containing a vinyl end group and compounds containing a methyl end group have low rotational viscosity.

The liquid crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid crystal components and liquid crystal compounds of the liquid crystal media in this application.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations also referred to as acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1-E-alkenyl, respectively, in each case having n, m or l C atoms. Table A lists the codes used for the ring elements of the core structures of the compounds, while Table B shows the linking groups. Table C gives the meanings of the codes for the left-hand or right-hand end groups. Table D shows illustrative structures of compounds with their respective abbreviations.

TABLE A

Ring elements

TABLE A-continued
| | Ring elements | | |
|---|---|---|---|
| Y | 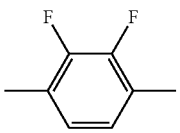 | | |
| M | 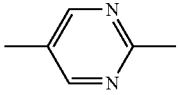 | Ml | 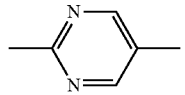 |
| N | 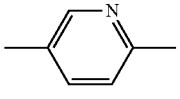 | Nl | 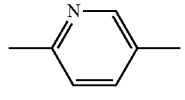 |
| Np | 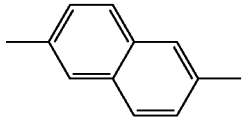 | | |
| N3f | 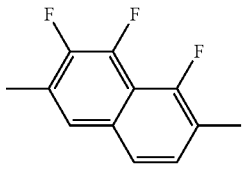 | N3fl | 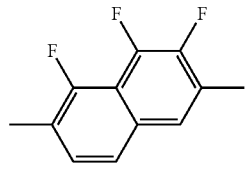 |
| tH | 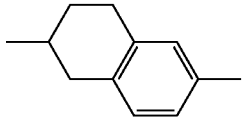 | tHl | 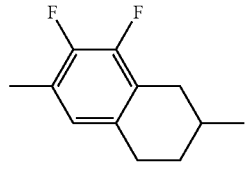 |
| tH2f | 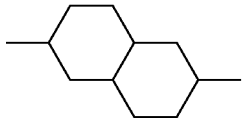 | tH2fl | 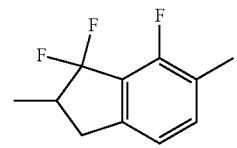 |
| dH | 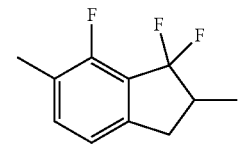 | | |
| K | 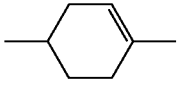 | Kl | 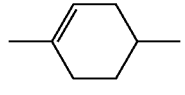 |
| L | 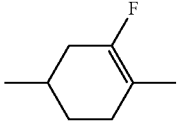 | Ll | 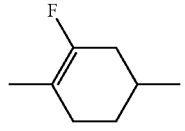 |
| F |  | Fl |  |

TABLE B

| | Linking groups | | |
|---|---|---|---|
| E | —$CH_2CH_2$— | Z | —CO—O— |
| V | —CH=CH— | ZI | —O—CO— |
| X | —CF=CH— | O | —$CH_2$—O— |
| XI | —CH=CF— | OI | —O—$CH_2$— |

TABLE B-continued

| | Linking groups | | |
|---|---|---|---|
| B | —CF=CF— | Q | —$CF_2$—O— |
| T | —C≡C— | QI | —O—$CF_2$— |
| W | —$CF_2CF_2$— | | |

TABLE C

| End groups | | | |
|---|---|---|---|
| Left-hand side | | Right-hand side | |
| Use alone | | | |
| -n- | $C_nH_{2n+1}$— | -n | —$C_nH_{2n+1}$ |
| -nO- | $C_nH_{2n+1}$—O— | -nO | —O—$C_nH_{2n+1}$ |
| -V- | $CH_2$=CH— | -V | —CH=$CH_2$ |
| -nV- | $C_nH_{2n+1}$—CH=CH— | -nV | —$C_nH_{2n}$—CH=$CH_2$ |
| -Vn- | $CH_2$=CH—$C_nH_{2n+1}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | $CFH_2$— | -M | —$CFH_2$ |
| -D- | $CF_2H$— | -D | —$CF_2H$ |
| -T- | $CF_3$— | -T | —$CF_3$ |
| -MO- | $CFH_2$O— | -OM | —$OCFH_2$ |
| -DO- | $CF_2$HO— | -OD | —$OCF_2H$ |
| -TO- | $CF_3$O— | -OT | —$OCF_3$ |
| -OXF- | $CF_2$=CH—O— | OXF | —O—CH=$CF_2$ |
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |
| Use together with others | | | |
| -...A...- | —C≡C— | -...A... | —C≡C— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | wherein n and m each denote integers, and the three dots "..." are placeholders for other abbreviations from this table.

The following table shows illustrative structures together with their respective abbreviations. These are shown in order to illustrate the meaning of the rules for the abbreviations. They furthermore represent compounds, which are preferably used.

TABLE D

Illustrative structures

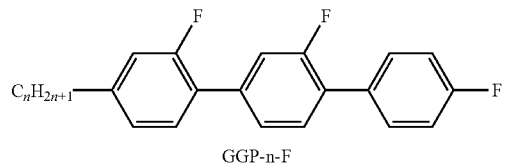

GGP-n-F

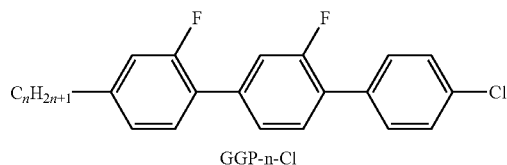

GGP-n-Cl

TABLE D-continued
| Illustrative structures |
|---|
| 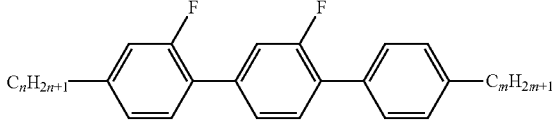 |
GGP-n-m
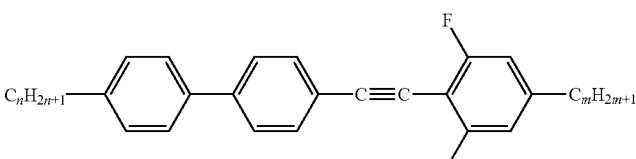
PPTUI-n-m
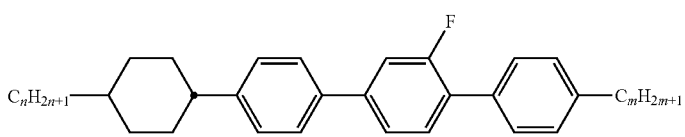
CPGP-n-m
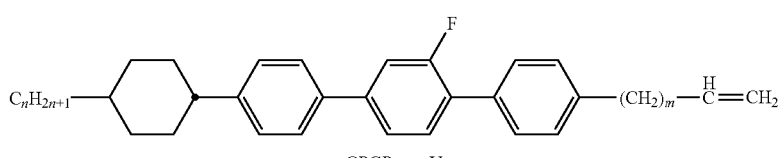
CPGP-n-mV
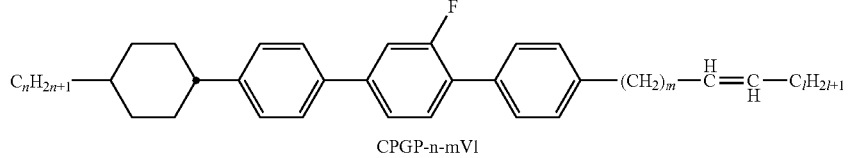
CPGP-n-mVl
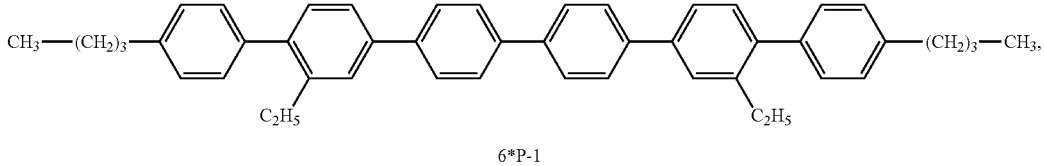
6*P-1
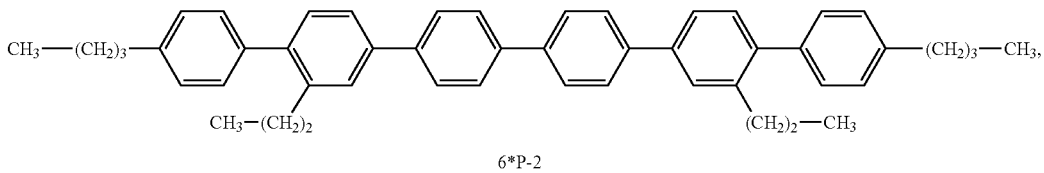
6*P-2
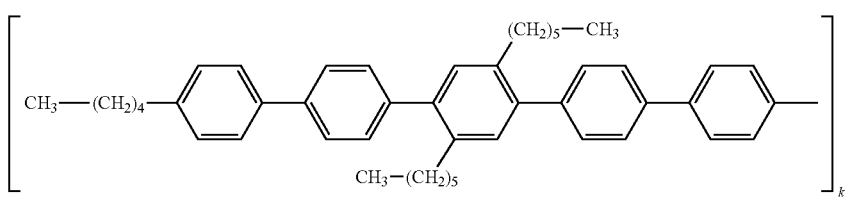
10*P-1

TABLE D-continued
Illustrative structures
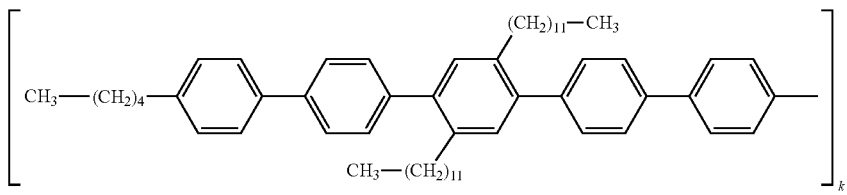
10*P-2
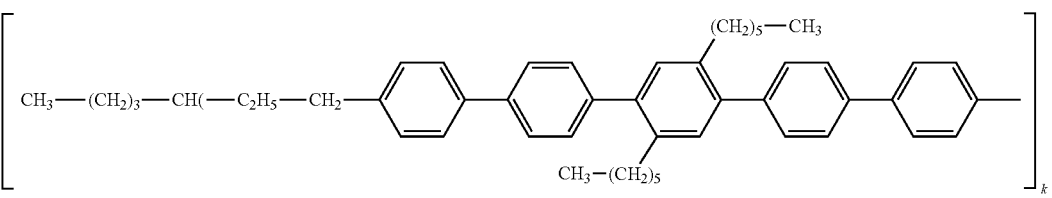
10*P-3
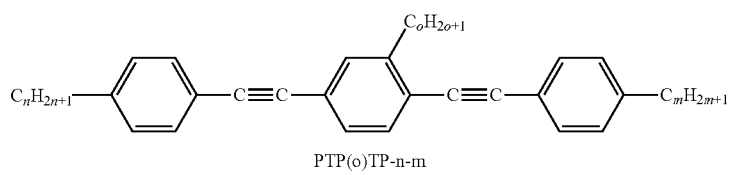
PTP(o)TP-n-m
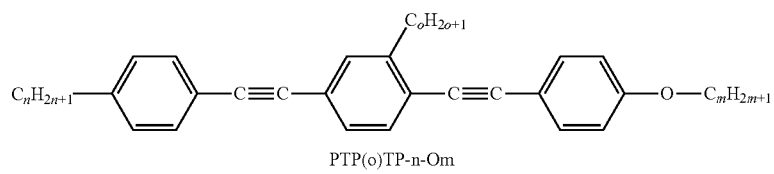
PTP(o)TP-n-Om
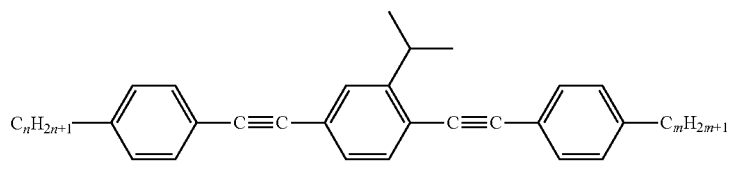
PTP(i3)TP-n-m
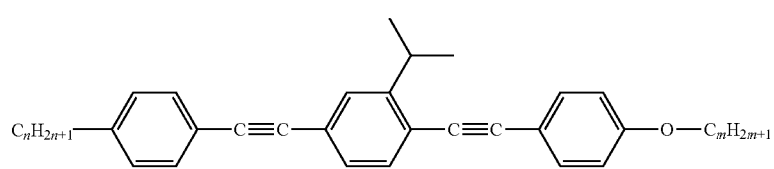
PTP(i3)TP-n-Om
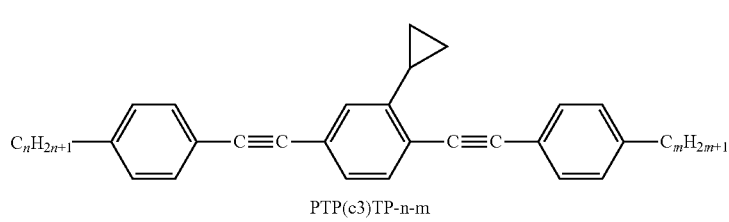
PTP(c3)TP-n-m TABLE D-continued
Illustrative structures
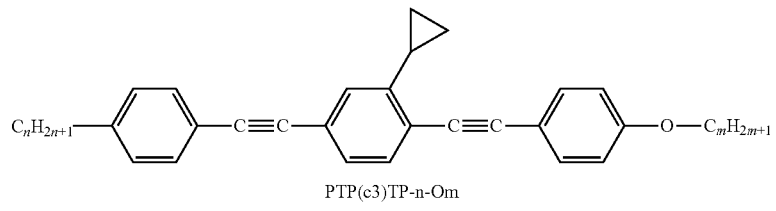
PTP(c3)TP-n-Om
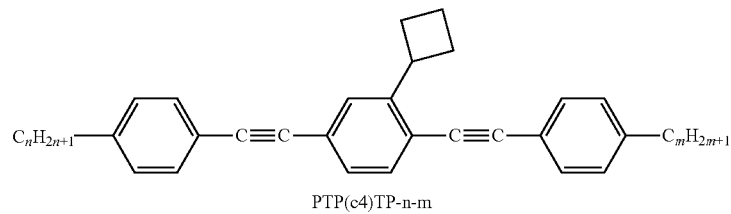
PTP(c4)TP-n-m
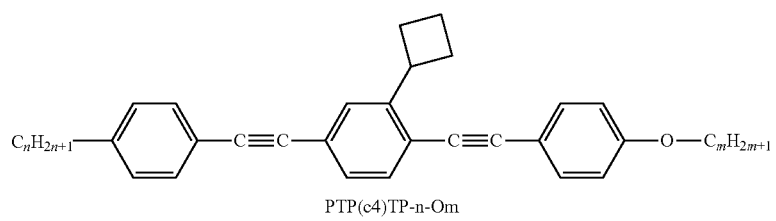
PTP(c4)TP-n-Om
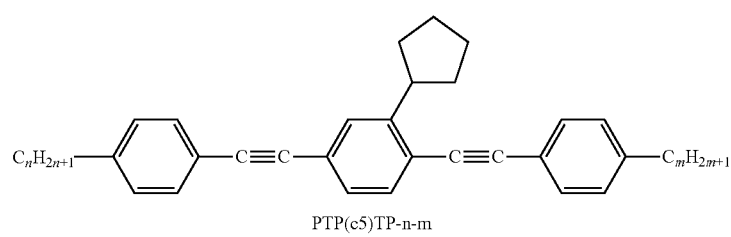
PTP(c5)TP-n-m
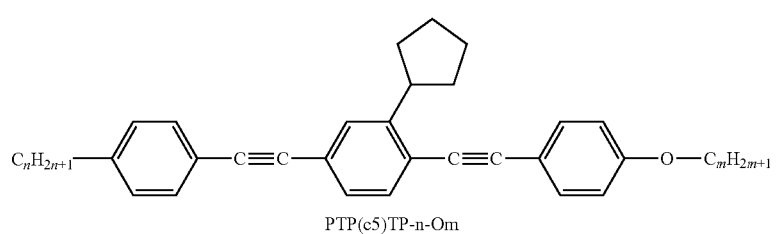
PTP(c5)TP-n-Om
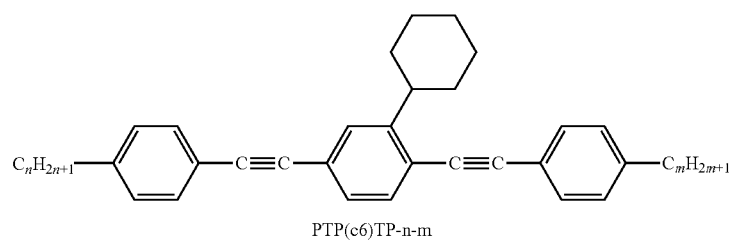
PTP(c6)TP-n-m TABLE D-continued
Illustrative structures
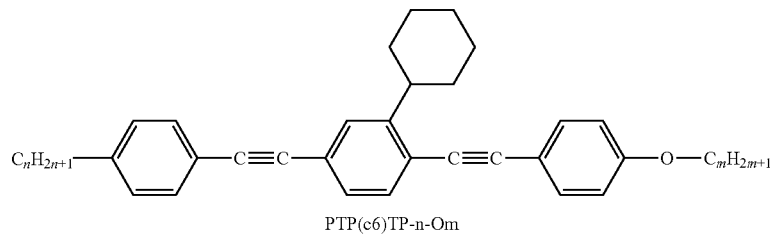
PTP(c6)TP-n-Om
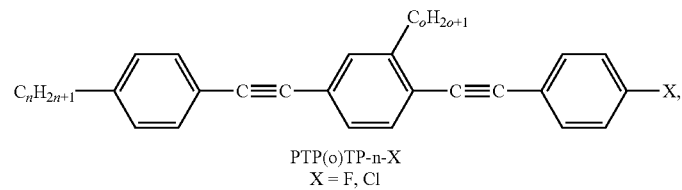
PTP(o)TP-n-X
X = F, Cl
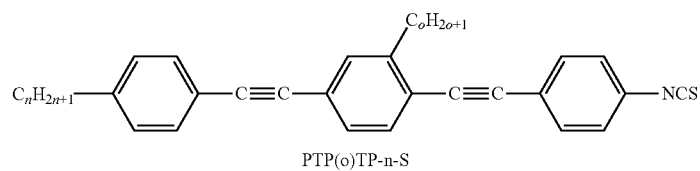
PTP(o)TP-n-S
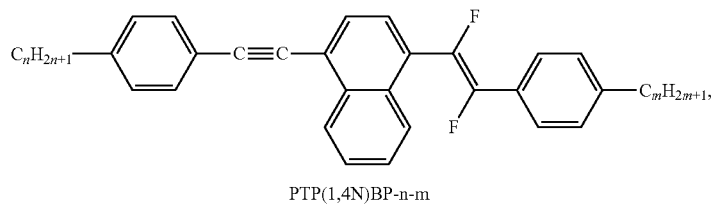
PTP(1,4N)BP-n-m
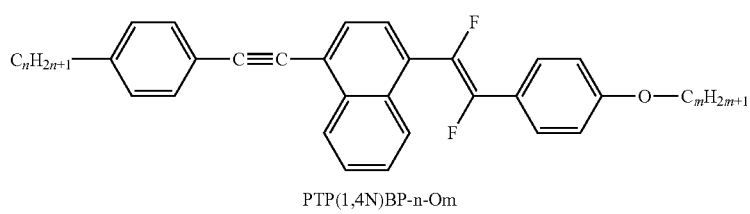
PTP(1,4N)BP-n-Om

EXAMPLES

The following examples illustrate the present invention without limiting it in any way.

However, it is clear to the person skilled in the art from the physical properties what properties can be achieved and in what ranges they can be modified. In particular, the combination of the various properties that can preferably be achieved is thus well defined for the person skilled in the art.

Example 1

A liquid crystal mixture M-1 having the composition and properties as indicated in the following table is prepared.

| No. | Composition Compound Abbreviation | |
|---|---|---|
| 1 | PPTUI-3-4 | 25.1 |
| 2 | PPTUI-4-4 | 48.5 |
| 3 | PPTUI-3-2 | 26.4 |
| Σ |  | 100.0 |

Physical properties

T (N, I) = 163.5° C.
$n_o$ (20° C., 589.3 nm) = 1.47
$\Delta n$ (20° C., 589.3 nm) = 0.40
$\epsilon_{\parallel}$ (20° C., 1 kHz) = 3.8
$\Delta\epsilon$ (20° C., 1 kHz) = 1.0
$\gamma_1$ (20° C.) = 310 mPa·s
$\epsilon_{r,\parallel}$ (20° C., 19 GHz) = 2.48
$\Delta\epsilon_r$ (20° C., 19 GHz) = 0.87
tan $\delta_{\epsilon\ r,\perp}$ (20° C., 19 GHz) = 0.0123
tan $\delta_{\epsilon\ r,\parallel}$ (20° C., 19 GHz) = 0.0034
τ (20° C., 19 GHz) 0.26
η (20° C., 19 GHz) 21.1

This mixture is very highly suitable for applications in the microwave range, in particular for phase shifters.

The invention claimed is:

1. A liquid crystal medium, comprising three or more compounds of formula I

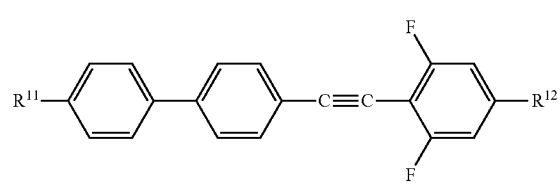

wherein $R^{11}$ denotes $C_nH_{2n+1}$ or $CH_2$=CH—$(CH_2)_z$, and
$R^{12}$ denotes $C_mH_{2m+1}$, O—$C_mH_{2m+1}$ or $(CH_2)_z$—CH=$CH_2$, n and m, independently of one another, denote an integer in the range from 1 to 9 and z denotes 0, 1, 2, 3 or 4, in a total concentration of ≥95% and wherein three of the compounds of formula I are:

48 to 65% of a compound of formula Ia

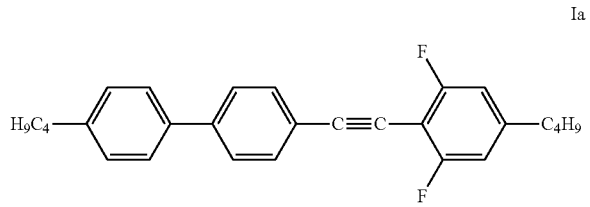

a compound of formula Ib

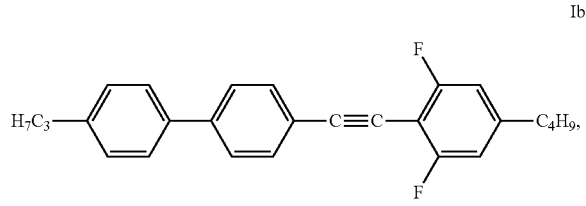

and a compound of formula Ic

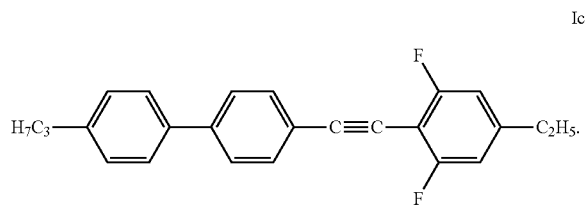

2. The liquid crystal medium according to claim 1, consisting of three or more compounds of formula I.

3. The liquid crystal medium according to claim 1, additionally comprising one or more compounds of formula IIa to IId

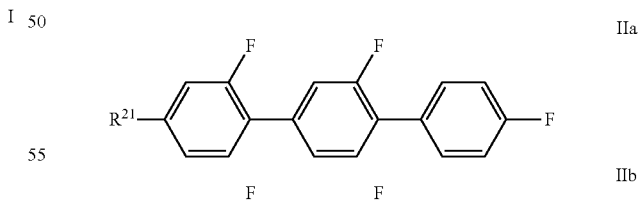

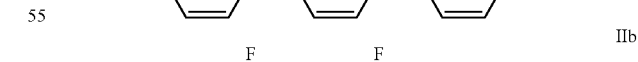

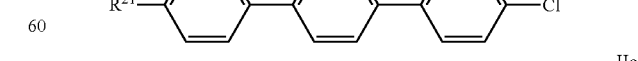

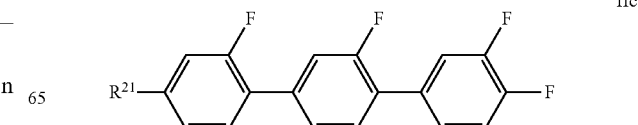

-continued

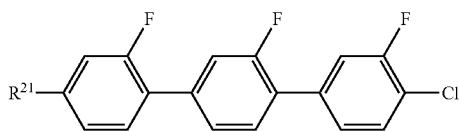
IId wherein
$R^{21}$ has the meaning of $R^{11}$ and $R^{12}$ given in formula I.

4. The liquid crystal medium according to claim 1, additionally comprising one or more compounds of formula III-1a

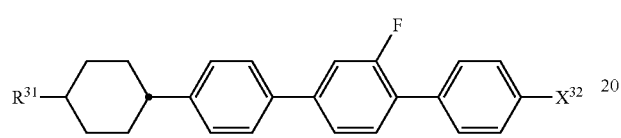
III-1a wherein
$R^{31}$ has the meaning of $R^{11}$ and $R^{12}$ given in formula I, and
$X^{32}$ denotes H, F, Cl, —CN, —NCS, —SF$_5$, fluorinated alkyl or fluorinated alkoxy having 1 to 7 C atoms or fluorinated alkenyl, unfluorinated or fluorinated alkenyloxy or unfluorinated or fluorinated alkoxyalkyl having 2 to 7 C atoms.

5. The liquid crystal medium according to claim 1, additionally comprising one or more compounds of formulae IV

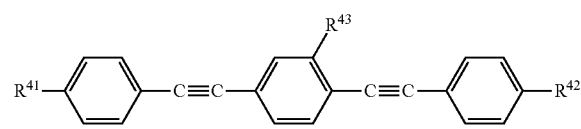
IV wherein
$R^{41}$ to $R^{43}$ independently of one another, denote unfluorinated alkyl or unfluorinated alkoxy, each having 1 to 15 C atoms, unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkylcycloalkenylalkyl, each having up to 15 C atoms.

6. The liquid crystal medium according to claim 1, additionally comprising one or more compounds of formulae V

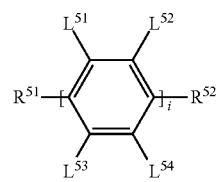
V wherein
$R^{51}$ and $R^{52}$ independently of one another, denote F or Cl, unfluorinated alkyl or fluorinated alkyl or unfluorinated alkoxy or fluorinated alkoxy, each having 1 to 15 C atoms, or unfluorinated alkenyl or fluorinated alkenyl, unfluorinated alkenyloxy or unfluorinated alkoxyalkyl or fluorinated alkoxyalkyl, each having 2 to 15 C atoms, in which, in addition, one or more "—CH$_2$—" groups may be replaced, independently of one another, by cycloalkyl having 3 to 6 C atoms, or one of $R^{51}$ and $R^{52}$ or both $R^{51}$ and $R^{52}$ denote H,
$L^{51}$ to $L^{54}$ on each appearance, in each case independently of one another, denote H, alkyl having 1 to 15 C atoms, F or Cl, and
i denotes an integer in the range from 5 to 15.

7. A high-frequency technology component, comprising a liquid crystal medium according to claim 1.

8. The component according to claim 7, suitable for operation in the microwave range.

9. The component according to claim 8, that is a phase shifter.

10. A microwave device, comprising one or more components according to claim 7.

\* \* \* \* \*